United States Patent
Tsirkin

(10) Patent No.: US 9,970,775 B2
(45) Date of Patent: May 15, 2018

(54) DETERMINING ALTERNATIVE ROUTE BY NAVIGATION SYSTEM

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 214 days.

(21) Appl. No.: 14/085,980

(22) Filed: Nov. 21, 2013

(65) Prior Publication Data

US 2015/0142300 A1    May 21, 2015

(51) Int. Cl.
*G01C 21/00* (2006.01)
*G01C 21/34* (2006.01)

(52) U.S. Cl.
CPC ................ *G01C 21/3415* (2013.01)

(58) Field of Classification Search
CPC .................................................. G01C 21/3415
See application file for complete search history.

(56) References Cited

U.S. PATENT DOCUMENTS

| | | | | |
|---|---|---|---|---|
| 5,550,538 A * | 8/1996 | Fujii | ................ | G01C 21/3415 340/990 |
| 7,363,153 B2 | 4/2008 | Nam et al. | | |
| 8,234,059 B2 | 7/2012 | Sugiyama et al. | | |
| 2002/0156573 A1* | 10/2002 | Stefan | ................ | G01C 21/3626 701/420 |
| 2002/0169545 A1* | 11/2002 | Toyooka | ................ | G01S 19/42 701/469 |
| 2003/0018428 A1* | 1/2003 | Knockeart | ......... | G01C 21/3415 342/357.31 |
| 2005/0222760 A1* | 10/2005 | Cabral | ............... | G01C 21/3492 701/423 |
| 2006/0080034 A1* | 4/2006 | Hayashi | ............. | G01C 21/3641 701/431 |
| 2008/0091348 A1 | 4/2008 | Choi | | |
| 2008/0243378 A1* | 10/2008 | Zavoli | .................... | G01C 21/28 701/533 |
| 2009/0171577 A1* | 7/2009 | Roumeliotis | .......... | G01C 21/30 701/533 |
| 2010/0121564 A1* | 5/2010 | Kobayashi | ............. | G01C 21/34 701/533 |
| 2010/0312466 A1 | 12/2010 | Katzer et al. | | |

(Continued)

FOREIGN PATENT DOCUMENTS

JP    2005091249 A    4/2005

OTHER PUBLICATIONS

Sanders, Peter, Schultes, Dominik, and Vetter, Christian, "Mobile Route Planning", Universitat Karlsruhe, 1:14.

(Continued)

*Primary Examiner* — Jess Whittington
(74) *Attorney, Agent, or Firm* — Lowenstein Sandler LLP

(57) ABSTRACT

Systems and methods for determining alternative navigational routes. An example method may comprise: determining a first route to a destination, the route comprising a plurality of edges of a graph representing a map of navigable paths, wherein each edge represents a path connecting two vertices and each vertex represents at least one of: an endpoint of a path or a junction of two or more paths; and determining a second route to the destination from a point located at least a defined distance from a junction comprised by the first route, along an edge not comprised by the first route.

20 Claims, 4 Drawing Sheets

(56) References Cited

U.S. PATENT DOCUMENTS

| | | | | |
|---|---|---|---|---|
| 2010/0324817 A1* | 12/2010 | Hansen | ............. | G01C 21/3415 |
| | | | | 701/414 |
| 2011/0040479 A1* | 2/2011 | Uyama | ................. | G01C 21/32 |
| | | | | 701/533 |
| 2011/0208429 A1* | 8/2011 | Zheng | ................ | G01C 21/3484 |
| | | | | 701/533 |
| 2012/0253663 A1* | 10/2012 | Hani | ................... | G01C 21/005 |
| | | | | 701/431 |
| 2013/0103313 A1 | 4/2013 | Moore et al. | | |
| 2013/0226731 A1* | 8/2013 | MacNeille | ............ | G06Q 10/00 |
| | | | | 705/26.8 |
| 2014/0171013 A1* | 6/2014 | Varoglu | ................ | H04W 4/021 |
| | | | | 455/404.2 |

OTHER PUBLICATIONS

Ibrahim, Ali and Cook, William R., "Automatic Prefetching by Traversal Profiling in Object Persistence Architectures", University of Texas at Austin, Department of Computer Sciences (24 pages).
Kaparias, I., and Bell, M.G.H., "A Reliability-Based Dynamic Re-routing Algorithm for In-Vehicle Navigation", Intelligent Transportation Systems (ITSC), 2010 13th International IEEE Conference 974:979.

\* cited by examiner

DETERMINING ALTERNATIVE ROUTE BY NAVIGATION SYSTEM

TECHNICAL FIELD

The present disclosure is generally related to computer systems, and is more specifically related to computer systems employing navigation methods based on positioning data.

BACKGROUND

A vehicle navigation system may process positioning data (provided, e.g., by a satellite-based positioning system and/or by a Navigation via Signals of Opportunity (NAVSOP) system), optionally augmented by motion data (provided, e.g., by a motion measurement device such as accelerometer), to output map information, location data and/or navigation instructions.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for determining alternative routes by navigational systems. In an illustrative example, a vehicle navigation system may determine a route from the vehicle's current position to a user-defined destination. If the vehicle deviates from the determined route, the system would need to determine a new route, which may require a finite time of at least several seconds. During that time, no navigation instructions are provided to the vehicle operator. Since the route deviation triggering the route update may have been caused by the operator's mistake in following the original route, further delays in providing navigational information are undesirable.

To address the above noted and various other deficiencies, a navigation system may implement a variety of methods for determining an alternative route, as described herein. In accordance with one or more aspects of the present disclosure, while the vehicle is moving along the original route, the navigation system may determine one or more alternative routes that might replace the current route if the vehicle's would deviate from the current route at one of the path junctions along the current route, as described in more details herein below. Hence, the new navigation instructions may be provided to the user as soon as the deviation from the current route is detected by the navigation system, without introducing further delays in providing navigational information.

Various aspects of the above referenced methods and systems are described in details herein below by way of examples, rather than by way of limitation.

Figure 1:
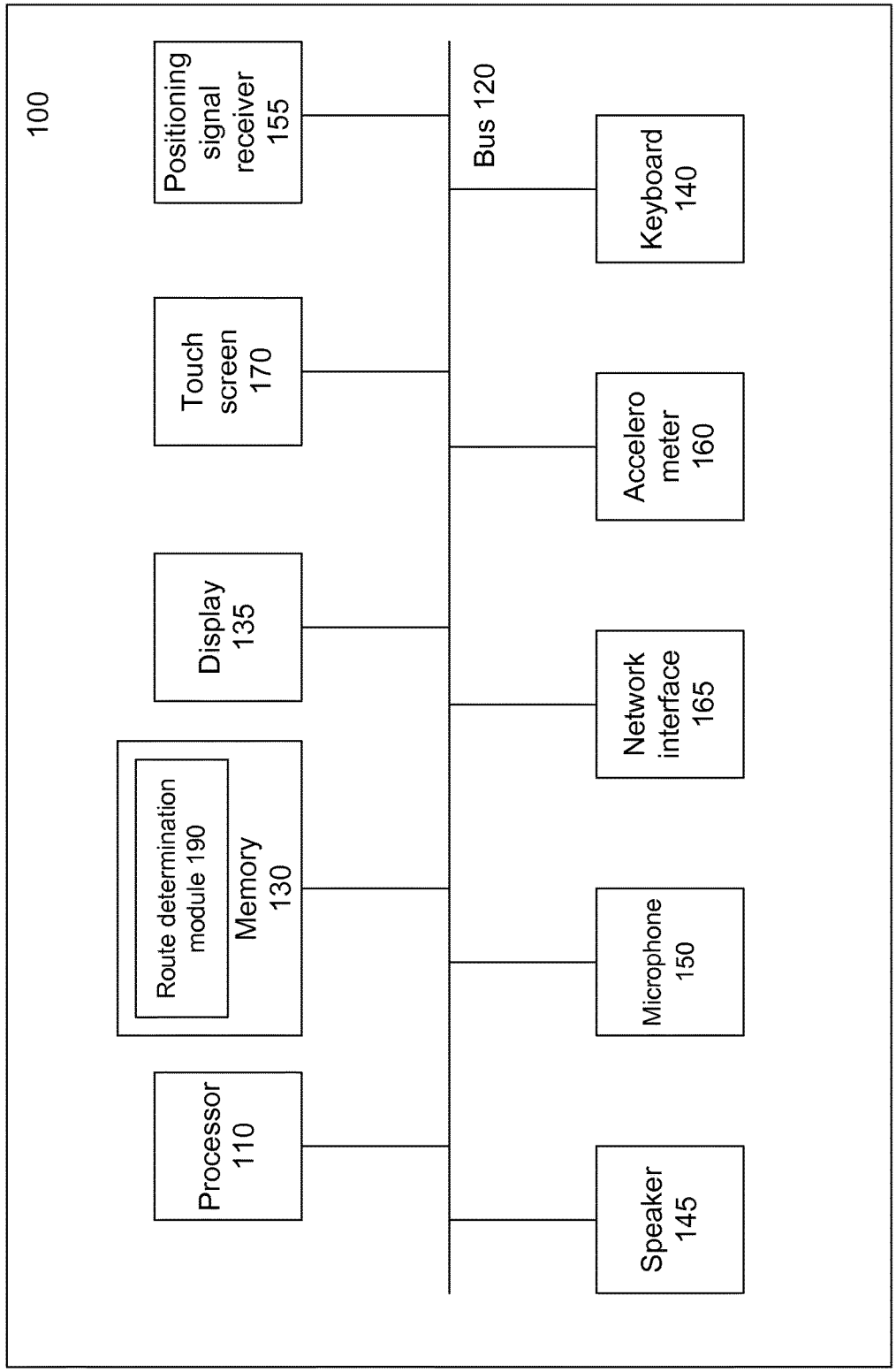
FIG. 1 schematically depicts a component diagram of an example computer system, in accordance with one or more aspects of the present disclosure.

FIG. 1 schematically depicts a high-level component diagram of an example navigation system 100 in accordance with one or more aspects of the present disclosure. In an illustrative example, navigation system 100 may be provided by a computer system comprising a graphical user interface and one or more positioning information input devices. "Computer system" herein shall refer to a data processing system comprising one or more processors, one or more memory devices, and one or more input/output (I/O) interfaces. In certain implementations, navigation system 100 may be provided, for example, by a dedicated dashboard-mountable navigation device, a smart phone, a tablet computer, or a notebook computer.

As schematically illustrated by FIG. 1, navigation system 100 may comprise a processor 110 coupled to a system bus 120. The latter may comprise a data bus, an address bus, and/or a control bus. Processor 110 may be represented by one or more physical processors, including general purpose processors (for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) and/or specialized processors (for example, an application specific integrated circuit (ASIC), a field programmable gate array (FPGA), or a digital signal processor (DSP)).

Other devices coupled to system bus may 120 include a memory 130, a display 135, and a positioning signal receiver 155. The term "coupled" herein shall include electrically connected and/or communicatively coupled via one or more interface devices, adapters and the like.

In an illustrative example, positioning signal receiver 155 may be provided by a satellite navigation signal receiver (e.g., Global Positioning Signal (SPG) receiver or a Global Navigation System (GLONASS) receiver). In another illustrative example, positioning signal receiver 155 may be provided by a NAVSOP signal receiver (e.g., a GSM signal receiver). In certain implementations, navigation system 100 may comprise two or more positioning signal receivers.

In certain implementations, navigation system 100 may further comprise a touch screen input device 170, represented, e.g., by a touch-sensitive and/or presence-sensitive surface of display 135. In an illustrative example, the touch-sensitive surface may comprise a capacity-sensitive layer. In another illustrative example, the touch-sensitive surface may comprise two or more acoustic transducers placed along the horizontal and vertical axes of the display.

In certain implementations, navigation system 100 may further comprise a keyboard 140, a speaker 145, a microphone 150, a motion measurement device (e.g., an accelerometer) 160, and/or a network interface 165, also coupled to system bus 120. Network interface 165 may be provided, for example, by an IEEE 802.11-compliant interface, a cellular interface (such as a 3G or 4G interface, including UMTS, LTE, WiMAX, HSPA, or EV-DO), and/or a Bluetooth interface. Navigation system 100 may implement a network protocol stack, such as TCP/IP, to support communications over the network interface 165.

Memory 130 may include one or more volatile memory devices (for example, RAM chips), one or more non-volatile memory devices (for example, ROM or EEPROM chips), and/or one or more secondary memory devices (for example, a storage memory device, such as an optical or magnetic disk). The storage memory may include a non-transitory computer-readable storage medium on which may be stored instructions implementing the methods described herein.

In certain implementations, memory 130 may store instructions of various code modules employed by navigation system 100, including instructions of a code module 190 for determining alternative navigation routes, in accordance with one or more aspects of the present disclosure. Alternatively, the methods described herein may be implemented by discrete hardware components or may be integrated in the functionality of other hardware components such as ASICS, FPGAs, DSPs or similar devices. In addition, the methods described herein may be implemented by firmware modules or functional circuitry within hardware devices. Further, the methods described herein may be implemented in any combination of hardware devices and software components.

Navigation system 100 may be designed to represent a map of navigable paths by a graph comprising a plurality of vertices linked by a plurality of edges. A vertex of the graph may represent an endpoint of a path and/or a junction of two or more paths. An edge of the graph may represent a path connecting two vertices. In certain implementations, the edges may be unidirectional or bi-directional representing, respectively, unidirectional or bi-directional navigable paths.

In certain implementations, a weight may be assigned to an edge to represent, e.g., the distance between the respective path endpoints or junctions. Alternatively, a weight assigned to an edge may represent a time period necessary to traverse the path represented by the edge at a defined vehicle speed (e.g., at a maximum allowed speed). Alternatively, a weight assigned to an edge may represent a user preference with respect to including the path represented by the edge into a route. Alternatively, a weight assigned to an edge may represent a cost involved in traversing the path represented by the edge (e.g., a toll to be paid).

Figure 2:
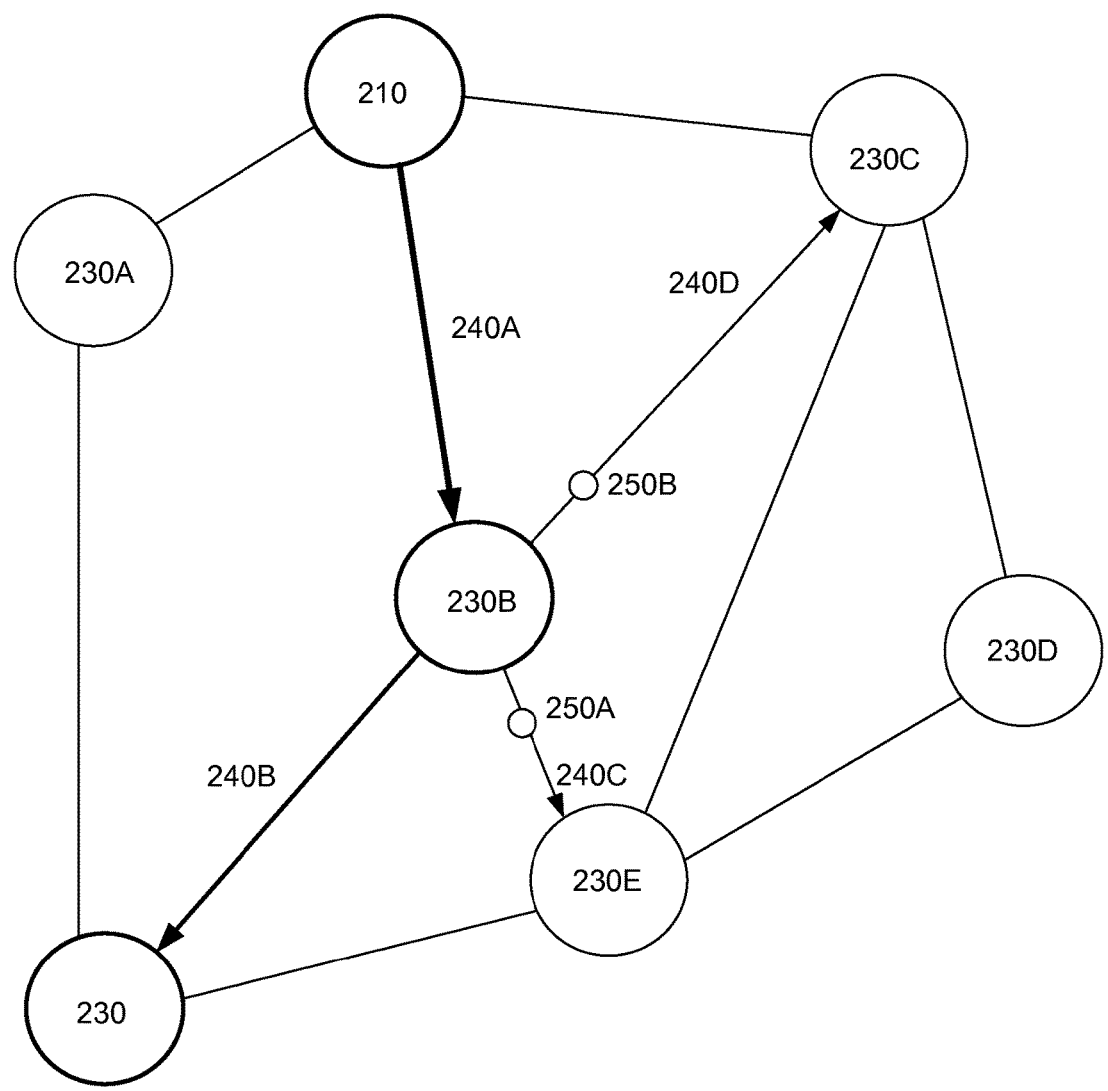
FIG. 2 schematically illustrates an example method of determining alternative navigational routes, in accordance with one or more aspects of the present disclosure.

Navigation system 100 may receive, e.g., via graphical user interface 170 or network interface 165, a destination point. Responsive to determining the current position based on the navigational signal received by positioning signal receiver 155, navigation system 100 may calculate a route from the current position 210 to the specified destination 220, as schematically illustrated by FIG. 2. The route 210 be represented by a subset of navigation graph 200, and may comprise a plurality of junctions 230 linked by a plurality of edges 240.

Navigation system 100 may employ a routing method yielding a route optimizing a pre-determined or user-specified optimization criterion (e.g., a shortest path or a fastest path). The optimization may be performed in view of one or more pre-determined or user-specified constraints (e.g., avoid toll roads, avoid freeways, avoid a particular path, or include a particular path). In an illustrative example, one or more pre-determined or user-specified constraints may be represented by weights assigned to a plurality of edges of the routing graph, and the routing method may be based on Dijkstra algorithm producing the shortest path over a graph with non-negative edge weights. In another illustrative example, certain heuristics may be used to minimize the computational complexity of the routing method, and hence sub-optimal routes may be yielded. In certain implementations, navigation system 100 may be programmed to select the routing method to be employed from two or more routing methods, e.g., based on the characteristics of the routing graph and/or the user preferences.

Alternatively, navigation system 100 may transmit a routing request comprising the current position and destination information to an external computer system over a wireless network. In certain implementations, the routing request may further comprise a pre-determined or user-specified optimization criterion and/or one or more pre-determined or user-specified constraints. Navigation system 100 may further receive, from the external computer system, a response corresponding to the routing request and comprising a suggested route to the destination.

Navigation system 100 may present the determined route to the user via graphical user interface 135 and/or audio output device 145. Navigation system 100 may further continuously determine own current position and present the current position to the user via graphical user interface 135.

In certain implementations, navigation system 100 may implement a method for determining alternative routes to the destination from a point located outside of the current route. In an illustrative example, an operator of the vehicle equipped with a navigational system may, intentionally or unintentionally, deviate from the current route, e.g., by traversing a junction 230B comprised by the current route to divert to an edge 240C not comprised by the current route.

As noted herein above, navigation system 100 may be designed to reduce the possible delay in providing navigational information to the vehicle operator if the vehicle deviates from the current route. As schematically illustrated by FIG. 2, the navigation system may, in anticipation of the vehicle's deviating from the current route, determine one or more alternative routes to the destination from one or more points located along one or more paths which the vehicle may traverse as the result of deviating from the current route. In an illustrative example, the navigation system may, before or during the vehicle's approaching a path junction, determine one or more alternative routes to the destination from one or more points located along the edges 240C, 240D connected to the junction being approached but not comprised by the current route.

As the vehicle is moving with a finite speed and the navigation system has a finite accuracy in determining own current position, the vehicle may move some distance along an edge which is not on the current route, before the deviation is detected by the navigation system, and switching to a new route is triggered. Hence, the navigation system may be configured to pre-determine, for each of one or more edges not comprised by the current route, an alternative route to the destination from a starting point 250 located at least a pre-defined or dynamically calculated minimum distance along the edge from the junction being approached by the vehicle. In an illustrative example, the minimum distance may be calculated as the current speed of the vehicle multiplied by a pre-determined period of time (e.g., a typical time of the user's reaction to deviating from the current route). In another illustrative example, the minimum distance may be calculated based on the estimated accuracy of determining own current position by the navigation system.

Alternatively, the navigation system may be configured to pre-determine, for each of one or more edges not comprised by the current route, an alternative route to the destination from a starting point located within a pre-defined or dynamically calculated maximum distance along the edge from the junction being approached by the vehicle. In an illustrative example, the maximum distance may be calculated as the current speed of the vehicle multiplied by a pre-determined period of time. In an illustrative example, the maximum distance may be calculated based on the estimated accuracy of determining own current position by the navigation system.

Alternatively, the navigation system may be configured to pre-determine, for each of one or more edges not comprised by the current route, an alternative route to the destination from a starting point located between the minimum and the maximum distance along the edge from the junction being approached by the vehicle.

In an illustrative example, for determining the alternative routes, navigation system 100 may employ the same routing method that was used for producing the current route. In another illustrative example, navigation system 100 may employ a different routing method for producing the alternative routes. In certain implementations, a more computationally complex routing method may be used for producing the initial route, while a fastest heuristic-based routing method may be used for producing alternative routes. Alternatively, navigation system 100 may be programmed to automatically select the routing method to be employed for determining alternative routes, e.g., based on the characteristics of the routing graph and/or the user preferences.

The routing methods employed for determining the initial and alternative routes may use the same optimization criterion (e.g., a shortest path or a fastest path), unless the user would specify a different optimization criterion for determining the alternative routes. The optimization may be performed in view of one or more pre-determined or user-specified constraints (e.g., avoid toll roads, avoid freeways, avoid a particular path, or include a particular path).

As noted herein above, one or more pre-determined or user-specified constraints may be represented by weights assigned to a plurality of edges of the routing graph. In an illustrative example, a user may indicate that a route segment representing by an edge of the routing graph is unnavigable (e.g., due to a road closure). Responsive to receiving the user input indicating the navigation unnavigable state of an edge, the navigation system may assign a large or infinite weight to the edge, thus preventing its inclusion into a route presented to the user.

As noted herein above, the navigation system may either calculate the alternative route or submit a routing request routing comprising the current position and destination information to an external computer system over a wireless network.

Responsive to detecting a deviation from the current route, the navigation system may identify a pre-calculated alternative route having the starting point on the path represented by an edge comprising the current vehicle position. Alternatively, the alternative route may be identified as a pre-calculated route having the starting point within a defined distance of the current vehicle position. Responsive to identifying the alternative route, the navigation system may replace the current route with the identified alternative route, thus making the identified alternative route current. The navigation system may then present the new current route to the user via graphical user interface 135 and/or audio output device 145.

Figure 3:
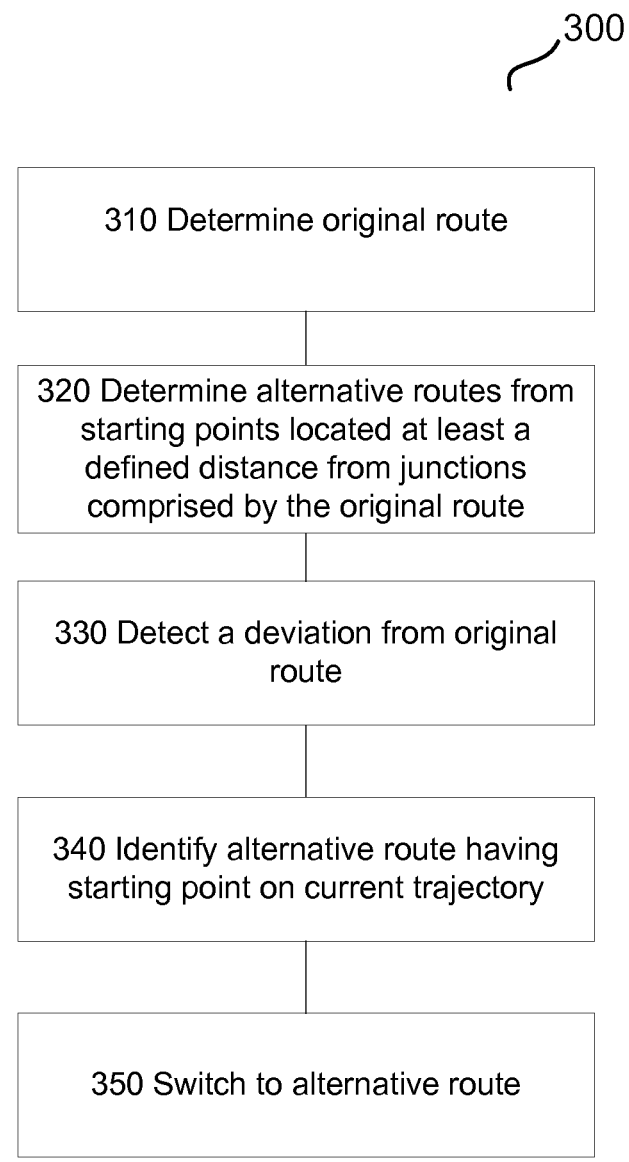
FIG. 3 depict a flow diagram of an example method for determining alternative navigational routes, in accordance with one or more aspects of the present disclosure.

FIG. 3 depicts a flow diagram of an example method 300 for determining alternative navigation routes in accordance with one or more aspects of the present disclosure. Method 300 and/or each of its individual functions, routines, subroutines, or operations may be performed by one or more processors of a computer system (e.g., navigation system 100 of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a navigation system may determine a route to a destination. As noted herein above, the route may comprise a plurality of edges of a graph representing a map of navigable paths. Each edge may represent a path connecting two vertices and each vertex may represent an endpoint of a path or a junction of two or more paths.

At block 320, the navigation system may determine one or more alternative routes to the destination from one or more points which the vehicle equipped with the navigation system is likely to traverse if the vehicle deviates from the original route. The starting points for the alternative routes may be located along the edges not comprised by the original route, if such edges have at least one junction comprised by the original route. In an illustrative example, a starting point for an alternative route may be located at least a defined distance from a junction comprised by the original route, along an edge not included in the original route. In another illustrative example, a plurality of starting points for the alternative routes may be located along two or more edges having at least one common junction with the edge being originally traversed by the vehicle carrying the navigation system.

At block 330, the navigation system may detect a deviation from the original route, determine that the current position of the vehicle carrying the navigation system does not belong to the original route.

At block 340, the navigation system may identifying a pre-calculated alternative route having the starting point on the edge being traversed by the vehicle carrying the navigation system (i.e., the edge comprising the current position).

At block 350, the navigation system may switch to the alternative route and continue the navigation process.

Upon completing the operations referenced by block 350, the method may terminate.

Figure 4:
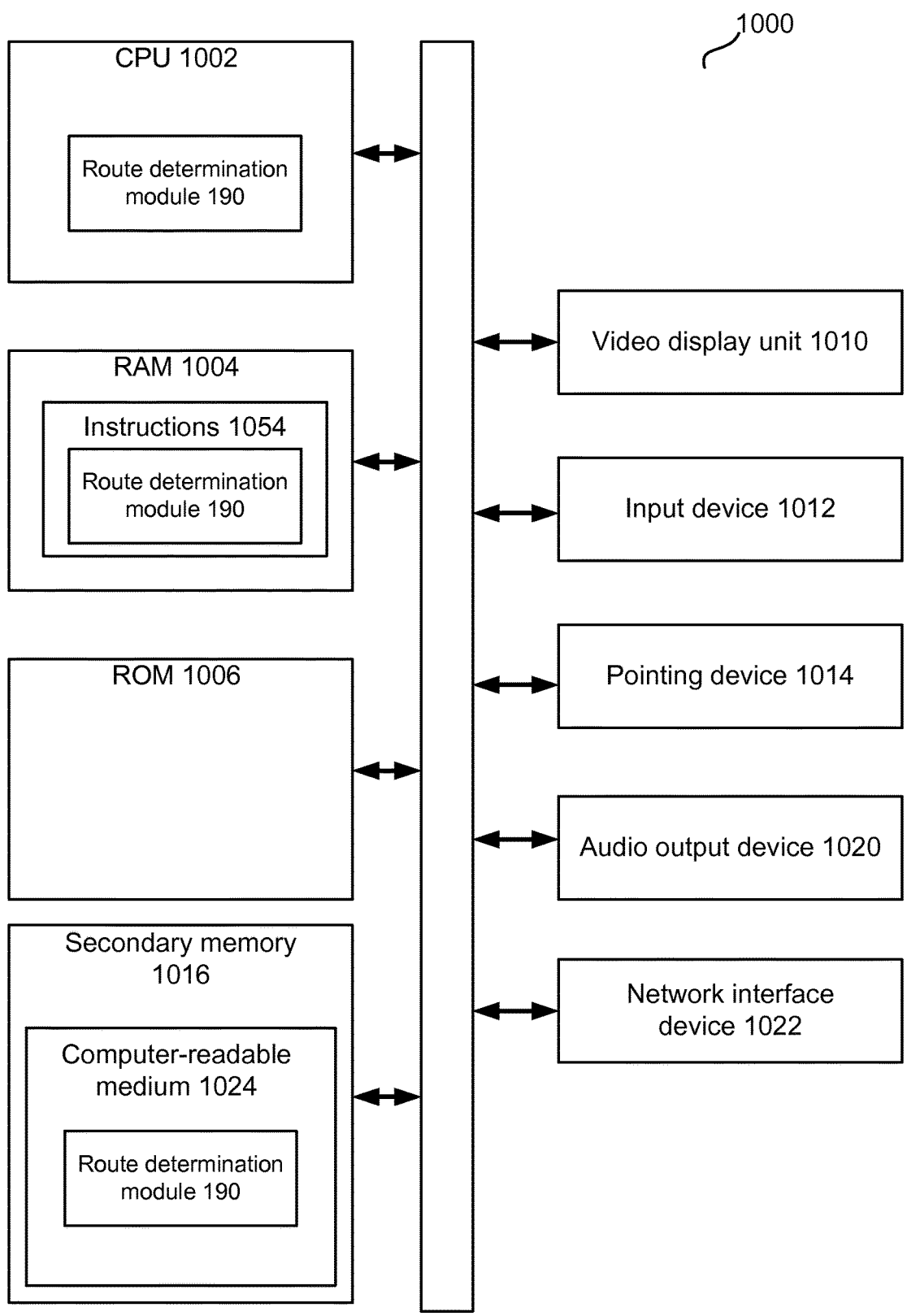
FIG. 4 depicts an illustrative computer system operating in accordance with in accordance with one or more aspects of the present disclosure.

FIG. 4 depicts an illustrative computer system operating in accordance with examples of the present disclosure. In illustrative examples, computer system 1000 may correspond to navigation system 100 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding navigational route determination module 190 implementing method 300 for determining alternative navigation routes in accordance with one or more aspects of the present disclosure. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   determining, by a processing device of a vehicle navigation system, a first route to a destination using a first routing method, the first route comprising a plurality of edges of a graph representing a map of navigable paths, wherein each edge represents a path connecting two vertices and each vertex represents at least one of: an endpoint of a path or a junction of two or more paths;
   determining a first distance corresponding to a current speed of the vehicle navigation system as the vehicle navigation system travels on the first route;
   determining a second distance corresponding to an accuracy of the vehicle navigation system in determining a position of the vehicle navigation system as the vehicle navigation system travels on the first route;
   determining a plurality of other routes to the destination while a current position of the vehicle navigation system is on the first route, wherein each of the plurality of other routes begins from a starting point that corresponds to an anticipated deviation from the first route located at least a defined distance from the current position of the vehicle navigation system as the vehicle navigation system travels on the first route, along edges not comprised by the first route, wherein the defined distance is less than the first distance and greater than the second distance; and
   causing a graphical user interface of the vehicle navigation system to display a second route of the plurality of other routes based on a deviation of the vehicle navigation system from the first route.

2. The method of claim 1, further comprising:
   determining that the current position does not belong to the first route; and
   identifying a particular route of the plurality of routes having the starting point on the edge comprising the current position.

3. The method of claim 1, wherein the first route is optimized for a first routing criterion and the plurality of other routes are optimized for a second routing criterion.

4. The method of claim 1, wherein the defined distance is determined as a defined time multiplied by a current vehicle speed.

5. The method of claim 1, wherein the defined distance is determined in view of an estimated accuracy of determining the current position.

6. The method of claim 1, further comprising:
transmitting a routing request to an external computer system to determine at least one of the first route or the plurality of other routes.

7. The method of claim 1, further comprising:
receiving a route from an external computer system to determine at least one of the first route or the plurality of other routes.

8. The method of claim 1, further comprising:
assigning a weight to an edge to determine at least one of the first route or the plurality of other routes.

9. The method of claim 8, wherein the weight represents a user preference with respect to including the path represented by the edge into the first route.

10. The method of claim 1, wherein the first routing method is different than a second routing method used to determine the second route, the second routing method being a heuristic-based routing method that is faster to calculate than the first routing method.

11. A system, comprising:
a memory; and
a processing device of a vehicle navigation system, operatively coupled to the memory, to:
determine a first route to a destination using a first routing method, the first route comprising a plurality of edges of a graph representing a map of navigable paths, wherein each edge represents a path connecting two vertices and each vertex represents at least one of: an endpoint of a path or a junction of two or more paths;
determine a first distance corresponding to a current speed of the vehicle navigation system as the vehicle navigation system travels on the first route;
determine a second distance corresponding to an accuracy of the vehicle navigation system in determining a position of the vehicle navigation system as the vehicle navigation system travels on the first route;
determine a plurality of other routes to the destination while a current position is on the first route, wherein each of the plurality of other routes begins from a starting point that corresponds to an anticipated deviation from the first route located at least a defined distance from the current position of the vehicle navigation system as the vehicle navigation system travels on the first route, along edges not comprised by the first route, wherein the defined distance is less than the first distance and greater than the second distance; and
cause a graphical user interface to display a second route of the plurality of other routes based on a deviation of the vehicle navigation system from the first route.

12. The system of claim 11, wherein the processing device is further configured to: determine that the current position does not belong to the first route; and identify a particular route of the plurality of other routes having the starting point on the edge comprising the current position.

13. The system of claim 11, wherein the defined distance is determined as a defined time multiplied by a current vehicle speed.

14. The system of claim 11, wherein the defined distance is determined in view of an estimated accuracy of determining the current position.

15. The system of claim 11, wherein the processing device is further configured to: transmit a routing request to an external computer system to determine at least one of the first route or the plurality of other routes.

16. The system of claim 11, wherein the processing device is further configured to: assign a weight to an edge to determine at least one of the first route or the plurality of other routes.

17. The system of claim 16, wherein the weight represents a user preference with respect to including the path represented by the edge into the first route.

18. A non-transitory computer-readable storage medium comprising executable instructions to cause a processing device of a vehicle navigation system to:
determine, by the processing device, a first route to a destination using a first routing method, the first route comprising a plurality of edges of a graph representing a map of navigable paths, wherein each edge represents a path connecting two vertices and each vertex represents at least one of: an endpoint of a path or a junction of two or more paths;
determine a first distance corresponding to a current speed of the vehicle navigation system as the vehicle navigation system travels on the first route;
determine a second distance corresponding to an accuracy of the vehicle navigation system in determining a position of the vehicle navigation system as the vehicle navigation system travels on the first route;
determine a plurality of other routes to the destination while a current position is on the first route, wherein each of the plurality of other routes begins from a starting point that corresponds to an anticipated deviation from the first route located at least a defined distance from the-current position of the vehicle navigation system as the vehicle navigation system travels on the first route, along edges not comprised by the first route, wherein the defined distance is less than the first distance and greater than the second distance; and
cause a graphical user interface to display a second route of the plurality of other routes based on a deviation of the vehicle navigation system from the first route.

19. The non-transitory computer-readable storage medium of claim 18, further comprising executable instructions to cause the processing device to:
determine that the current position does not belong to the first route; and
identify a particular route of the plurality of other routes having the starting point on the edge comprising the current position.

20. The non-transitory computer-readable storage medium of claim 18, wherein executable instructions further cause the processing device to:
assign a weight to an edge to determine at least one of the first route or the plurality of other routes.

* * * * *